United States Patent
Lieu (10) Patent No.: US 11,308,264 B2
(45) Date of Patent: *Apr. 19, 2022

(54) MANAGING DOCUMENT ANNOTATIONS IN A PUBLISH/SUBSCRIBE SYSTEM

(71) Applicant: International Business Machines Corporation, Armonk, NY (US)

(72) Inventor: Hanson Lieu, Milton Keynes (GB)

(73) Assignee: International Business Machines Corporation, Armonk, NY (US)

(*) Notice: Subject to any disclaimer, the term of this patent is extended or adjusted under 35 U.S.C. 154(b) by 1700 days.

This patent is subject to a terminal disclaimer.

(21) Appl. No.: 14/792,746

(22) Filed: Jul. 7, 2015

(65) Prior Publication Data

US 2017/0011021 A1   Jan. 12, 2017

(51) Int. Cl.
*G06F 40/169* (2020.01)
*G06F 21/62* (2013.01)
(Continued)

(52) U.S. Cl.
CPC ........ *G06F 40/169* (2020.01); *G06F 16/9535* (2019.01); *G06F 21/6209* (2013.01);
(Continued)

(58) Field of Classification Search
CPC ...... G06F 17/24; G06F 40/117; G06F 40/169; G06F 16/9535; G06F 21/6209; H04L 63/105; H04L 63/107; H04L 63/108
(Continued)

(56) References Cited

U.S. PATENT DOCUMENTS

| 5,870,605 A | 2/1999 | Bracho et al. |
| 6,957,233 B1 | 10/2005 | Beezer et al. |

(Continued)

FOREIGN PATENT DOCUMENTS

| CN | 101056190 A | 10/2007 |
| CN | 103562890 A | 2/2014 |

OTHER PUBLICATIONS

List of IBM Patents or Patent Applications Treated as Related, Apr. 27, 2016, 2 pages.
(Continued)

*Primary Examiner* — Kavita Stanley
*Assistant Examiner* — Tionna M Burke
(74) *Attorney, Agent, or Firm* — Nicholas D. Bowman (57) ABSTRACT

Managing document annotations in a publish/subscribe system is described. A publishing system creates annotations of a document that include references to where the annotations are to be displayed; stores the annotations separately from the document; names an annotation set using tags; sets roles and permissions for use of the annotation set, including access permissions based on a time and/or location constraint of a subscribing user; and publishes the annotation set to a publish/subscribe broker for access by the subscribing users. A subscribing system subscribes a user to annotations of a document, wherein each annotation is separate from the document and includes reference to where the annotations are to be displayed. The subscribing system also defines a role of the subscribing user, wherein use permissions of the annotations by the subscribing user are controlled based on the role, including time and/or location constraints of the subscribing user.

2 Claims, 6 Drawing Sheets

(51) Int. Cl.
*G06F 16/9535* (2019.01)
*G06F 40/117* (2020.01)
*H04L 29/06* (2006.01)

(52) U.S. Cl.
CPC .......... *G06F 40/117* (2020.01); *H04L 63/105* (2013.01); *H04L 63/107* (2013.01); *H04L 63/108* (2013.01)

(58) Field of Classification Search
USPC ...................................................... 715/230
See application file for complete search history.

(56) References Cited

U.S. PATENT DOCUMENTS

| | | | |
|---|---|---|---|
| 7,209,948 | B2 | 4/2007 | Srinivasa |
| 7,370,269 | B1 | 5/2008 | Prabhu et al. |
| 7,373,590 | B2 | 5/2008 | Woolf et al. |
| 7,890,489 | B2 | 2/2011 | Stewart et al. |
| 8,495,160 | B2 | 7/2013 | Fletcher et al. |
| 8,635,520 | B2 | 1/2014 | Christiansen et al. |
| 8,706,685 | B1* | 4/2014 | Smith ............... G06F 17/30882 707/608 |
| 8,868,661 | B2 | 10/2014 | Asawa et al. |
| 9,237,202 | B1 | 1/2016 | Sehn |
| 9,832,149 | B2 | 11/2017 | Uraizee et al. |
| 2002/0120697 | A1 | 8/2002 | Generous et al. |
| 2003/0208539 | A1 | 11/2003 | Gildenblat et al. |
| 2004/0237033 | A1* | 11/2004 | Woolf ................... G06F 17/242 715/211 |
| 2005/0262051 | A1 | 11/2005 | Dettinger et al. |
| 2006/0126621 | A1 | 6/2006 | Bedi et al. |
| 2008/0098294 | A1* | 4/2008 | Le ........................ G06F 17/241 715/230 |
| 2008/0134202 | A1 | 6/2008 | Craggs et al. |
| 2008/0215744 | A1 | 9/2008 | Shenfield |
| 2009/0106271 | A1 | 4/2009 | Chieu et al. |
| 2009/0164301 | A1 | 6/2009 | O'Sullivan et al. |
| 2009/0327855 | A1 | 12/2009 | Le |
| 2010/0023587 | A1 | 1/2010 | Fletcher et al. |
| 2011/0154180 | A1 | 6/2011 | Evanitsky et al. |
| 2011/0173214 | A1 | 7/2011 | Karim |
| 2011/0320550 | A1 | 12/2011 | Lawson et al. |
| 2012/0041822 | A1 | 2/2012 | Landry et al. |
| 2012/0209924 | A1 | 8/2012 | Evans et al. |
| 2012/0215872 | A1 | 8/2012 | Beardsmore et al. |
| 2013/0031453 | A1 | 1/2013 | Griffiths et al. |
| 2013/0080916 | A1* | 3/2013 | Lopez ................... H04N 5/445 715/753 |
| 2013/0091295 | A1 | 4/2013 | Meijer et al. |
| 2014/0236808 | A1 | 8/2014 | Bilynsky |
| 2014/0310305 | A1 | 10/2014 | Christiansen et al. |
| 2014/0344314 | A1 | 11/2014 | Gray-Donald et al. |
| 2015/0139610 | A1 | 5/2015 | Syed et al. |
| 2016/0063087 | A1* | 3/2016 | Berson ............... G06Q 30/0259 707/740 |
| 2016/0112438 | A1 | 4/2016 | Hengstler et al. |
| 2017/0012909 | A1 | 1/2017 | Lieu |
| 2017/0012916 | A1 | 1/2017 | Lieu |
| 2017/0012993 | A1 | 1/2017 | Lieu |
| 2017/0060829 | A1 | 3/2017 | Bhatt |

OTHER PUBLICATIONS

IBM, "IBM Daeja ViewONE", printed Jul. 9, 2018, 3 pages, https://www.ibm.com/us-en/marketplace/ibm-daeja-viewone.
Lieu, H., "Control of Messages in Publish/Subscribe System", U.S. Appl. No. 16/243,259, filed Jan. 9, 2019.
Lieu, H., "Control of Messages in Publish/Subscribe System", U.S. Appl. No. 16/243,272, filed Jan. 9, 2019.
IBM, List of IBM Patents or Patent Applications Treated as Related, Jan. 8, 2019, 2 pages.
Gulati, R., "View and Annotate Documents Online with GroupDocs' Document Management Apps," GroupDocs Your Document Collaboration APIs, Sep. 20, 2013, 5 pages, © GroupDocs—A division of Aspose. All Rights Reserved.
Zhiguo Gong, "Efficient Filtering Algorithms for Location-Aware Publish/Subscribe," IEEE Transactions on Knowledge and Data Engineering, 2 pages, Copyright© 2015 IEEE.
Oracle, "JMS Message Selectors," The Java EE 6 Tutorial, 1 page, © 2010, Oracle Corporation and/or its affiliates, https://docs.oracle.com/cd/E19798-01/821-1841/bncer/index.html.
Lieu, H., "Control of Messages in Publish/Subscribe System," U.S. Appl. No. 14/792,759, filed Jul. 7, 2015.
List of IBM Patents or Patent Applications Treated as Related.

* cited by examiner

MANAGING DOCUMENT ANNOTATIONS IN A PUBLISH/SUBSCRIBE SYSTEM

BACKGROUND

The present disclosure relates to managing document annotations, and more specifically, to managing document annotations in a publish/subscribe system.

The ability to include or overlay extra information onto digital documents has become increasingly important. Highlighting areas of text, images, adding notes and references, overlaying parts of the document and saving these updates (annotations) without the need to modify the underlying document is increasingly used in many situations.

It is becoming the norm for viewer applications to supply annotation capabilities that individual users can create annotations for the document they viewed. However, collaboration between users such that they can publish their changes and subscribe to receive others' changes is currently limited.

Therefore, there is a need in the art to address the aforementioned problems.

SUMMARY

According to embodiments, a first aspect of the present invention includes a method for managing document annotations in a publish/subscribe system as carried out at a publishing system. As part of the method, the publishing system creates annotations of a document and stores the annotations separately from the document. The annotations include reference to locations for the display of the annotations in relation to the display of the document. A set of the annotations is named using at least one tag. Roles and permissions for use of the set of the annotations by subscribing users are set. This setting of roles and permissions includes setting access permissions based on at least one of a time constraint and/or a location constraint of a subscribing user. The set of the annotations are published to a publish/subscribe broker for access by the subscribing users.

In an embodiment, this first aspect provides the advantage of enabling a publishing user to provide annotations to an underlying document which remains unchanged. Annotations may be controlled for access by subscribing users based on a role of the subscribing user and a time and/or location of the subscribing user. A single set of annotations may therefore be published for an existing document with different results for different subscribers.

In an embodiment, setting access permissions based on a time constraint and/or a location constraint may be applied to the subscription time of the subscribing user or the location of the subscribing user. Additionally or alternatively, setting access permissions based on a time constraint and/or based on a location constraint may be applied to the displaying time of the subscribing user or the displaying location of the subscribing user. Such an embodiment may have the benefit that control of the access to annotations can be defined based on time and/or location when a subscribing user is subscribing and/or when a subscribing user is displaying the annotations.

In an embodiment, setting roles and permissions may further include setting editing permissions for subscribing users. This may mean that only subscribing users with editing permission may edit the annotations.

In an embodiment, as further part of the method, the set of the annotations may be edited and re-published as updates by a publishing user. This may enable the publishing user to supply updates to existing annotations which may be available at defined times and may further enable the publishing user to provide an updated version to replace the original annotations.

In an embodiment, setting roles and permissions may further include scheduling when a set of annotations is available to the subscribing users.

According to embodiments, a second aspect of the present invention includes a method for managing document annotations in a publish/subscribe system as carried out at a subscribing system. As part of the method, the subscribe system subscribes a user to annotations of a document. Each of the annotations is separate from the document. Further, each annotation includes reference to the display of the annotation in relation to the display of the document. A role of the subscribing user is defined. Use permissions of a set of the annotations by the subscribing user are controlled based on the defined role of the subscribing user. The use permissions include access permissions based on a time constraint and/or a location constraint of the subscribing user.

In an embodiment, the method carried out at the subscribing system corresponds to that of an embodiment of the method provided by the publishing system and has the advantage of the subscribing user only having access to annotations as controlled by the publisher.

In an embodiment, the subscription of the subscribing user may be filtered using at least one tag and based on a publishing user.

In an embodiment, the access permissions include subscription access permissions including subscription access based on a time constraint and/or based on a location of the subscribing user. Alternatively or additionally, access permissions may include display access permissions including display access based on a time constraint and/or based on a location of the subscribing user. In an embodiment, use permissions may also include editing permissions for subscribing users.

In an embodiment, as further part of the method, updates of annotations as re-published by the publishing user may be subscribed to.

In an embodiment, as further part of the method, the set of the annotations on the document may be displayed at the subscribing user as pseudo annotations. Further, the subscribing user may be enabled to select to burn the set of the annotations into a local copy of the document.

In an embodiment, as further part of the method, the subscribing user may be enabled to filter a display of the set of the annotations at the subscribing user. This may enable a subscribing user to have control over the display of the annotations within the defined role permissions. In an embodiment, as further part of the method, displaying the set of the annotations may be selected based on a version of the set of the annotations.

According to embodiments, a third aspect of the present invention includes a publishing system for managing document annotations in a publish/subscribe system. The publishing system includes an annotation creation component configured for creating annotations of a document. The annotations include reference for the display of the annotations in relation to the display of the document. The annotation creation component is further configured for storing the annotations separately from the document. The publishing system further includes an annotation control component. The annotation control component includes a tagging component configured for naming a set of the annotations using at least one tag. The annotation control component further includes a role and permission component configured for setting roles and permissions for use of the set of the annotations by subscribing users, including setting access permissions based on a time constraint and/or a location constraint of a subscribing user. The publishing system further includes an annotation publication component configured for publishing the set of the annotations to a publish/subscribe broker for access by subscribing users.

In an embodiment, the setting of the access permissions based on a time constraint and/or a location constraint may be applied to a subscription time, a subscription location of the subscribing user, a display time, and/or a display location of the subscribing user.

In an embodiment, the publishing system may further include an annotation update publication component configured for re-publishing updates of the set of the annotations.

According to some embodiments, a fourth aspect of the present invention includes a subscribing system for managing document annotations in a publish/subscribe system. The subscribing system includes an annotation subscription component configured for subscribing a user to annotations of a document, wherein each annotation is separate from the document and each annotation includes reference to its display in relation to the display of the document. The subscribing system further includes a role and permission component configured for defining a role of the subscribing user, wherein use permissions of a set of the annotations by the subscribing user are controlled based on the role and the use permissions include access permissions based on a time constraint and/or a location constraint of the subscribing user.

In an embodiment, the subscribing system may further include an filter component configured for filtering, using at least one tag, the subscription of the subscribing user to the set of the annotations.

In an embodiment, the subscribing system may further include a display options component configured for displaying the set of the annotations on the document at the subscribing user as pseudo annotations. The display options component may be further configured for enabling the subscribing user to select to burn the annotations into a local copy of the document.

According to embodiments, a fifth aspect of the present invention includes a computer program product for managing document annotations in a publish/subscribe system as carried out at a publishing system. The computer program product includes a computer readable storage medium having program instructions embodied therewith. These program instructions are executable by a processor to cause the processor to perform several actions. These actions may include creating annotations of a document. The annotations may include reference to the display of the annotations in relation to the display of the document. These actions may further include naming a set of the annotations using at least one tag. These actions may also further include setting roles and permissions for use of the set of the annotations by subscribing users. This may setting roles and permissions may include setting access permissions based on a time constraint and/or a location constraint of a subscribing user. These actions may also further include publishing the set of the annotations to a publish/subscribe broker for access by subscribing users.

According to embodiments, a sixth aspect of the present invention includes a computer program product for managing document annotations in a publish/subscribe system as carried out at a subscribing system. The computer program product includes a computer readable storage medium having program instructions embodied therewith. These program instructions are executable by a processor to cause the processor to perform several actions. These actions may include subscribing a user to annotations of a document, wherein each annotation is separate from the document and each annotation includes reference to the display of the annotation in relation to the display of the document. These actions may further include defining a role of the subscribing user, wherein use permissions of a set of the annotations by the subscribing user are controlled based on that role and the use permissions include access permissions based on a time constraint and/or a location constraint of the subscribing user.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

An embodiment of the described method and system provides a publish and subscribe mechanism of annotations to allow users to create additional content on top of documents that they can share with others. Subscribers can choose to add published content to a document based on a number of criteria, make edits to the content, and re-publish.

An embodiment of a method and system of managing documents in a publish/subscribe system is described. An author and at least one recipient are publishing and subscribing entities in embodiments of the method and system. The author annotates a copy of a document to create a tagged annotation set that can be used in the display of an annotated document comprising the copy of the document and a set of the annotations. The author publishes to the recipient the annotated document based on roles/permissions of the recipient, and on tags associated with published items, so that a recipient can only receive annotations that they have permission for. The recipient may subscribe to the annotated document based on roles/permissions of system factors. The factors may include those of: recipient, user who published the items, the tags associated with the items, the role/permission associated with the items, etc.

An embodiment of the described method and system starts with a system where a user can create annotations for a document. The annotations may include highlighting text, adding notes to portions of a document, redacting certain areas, overlaying images, adding links, etc. The annotations are not burned into the document but are saved separately (e.g., in a separate file or separate portion of a same file). When the viewer displays the document, the display system overlays the annotations on top of the document.

After the annotations have been created and saved, the user can publish them. The user can also subscribe to published items from other users.

An embodiment of a publish/subscribe system is provided for annotations such that a user can publish annotations to a document based on roles/permissions. The user may publish annotations singly or as a group, and name and tag them. An embodiment of the method and system may also enable a user to decide whether the published items will be received by other users when they subscribe, or automatically when they open a document. An embodiment of the method and system may provide the ability for a user to subscribe to published items based on the user who published them, the tags associated with the items, the role/permission associated with the items, and the ability to automatically display the changes on the document the subscriber is viewing.

Figure 1:
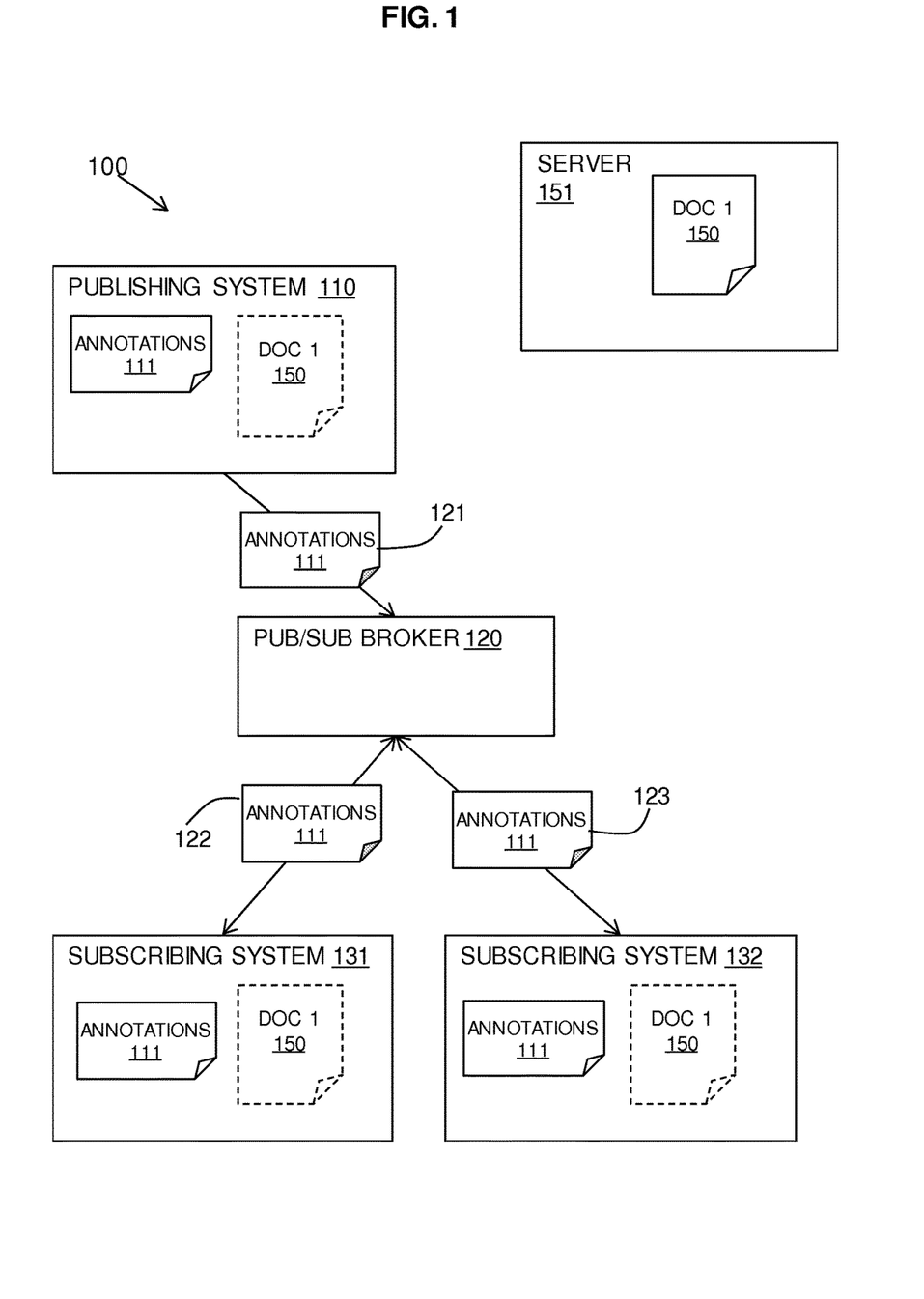
FIG. 1 is a schematic diagram of a publish/subscribe system in which embodiments of the present invention may be implemented.

Referring to FIG. 1, a schematic diagram illustrates a publish/subscribe system 100 as used herein, in accordance with an embodiment. The publish/subscribe system 100 includes at least one publishing system 110, which publishes messages to multiple subscribing systems 131, 132 via a publish/subscribe broker 120. The broker 120 receives published messages from the publishing system 110 and forwards these to subscribing systems 131, 132, based on subscription criteria.

In this embodiment, a server 151 may store a document 150, which is to be annotated. The document 150 may be provided remotely to the publishing system 110 and subscribing systems 131, 132 and users at these subscribing systems 131, 132 may view the document 150 via a browser. Alternatively, the document 150 may be downloaded by the publishing system 110 and the subscribing systems 131, 132 and stored locally. In both cases the publishing system 110 and the subscribing systems 131, 132 may each include a display component for displaying the document 150.

An embodiment of the publishing system 110 provides functionality described further below for annotations 111 to be created for display and interaction with the document 150. The annotations 111 are provided independently of the document 150 to which they relate, leaving the document 150 unchanged.

The annotations 111 may be published (at 121) by the publishing system 110 via the publish/subscribe broker 120. The subscribing systems 131, 132 may subscribe to the annotations 111 and may receive these (at 122 and 123, respectively) and display them locally in association with the document 150.

The functionality providing for the delivery of the annotations and the restrictions on the use of the annotations by subscribing system in an embodiment is described in more detail below.

Figure 2A:
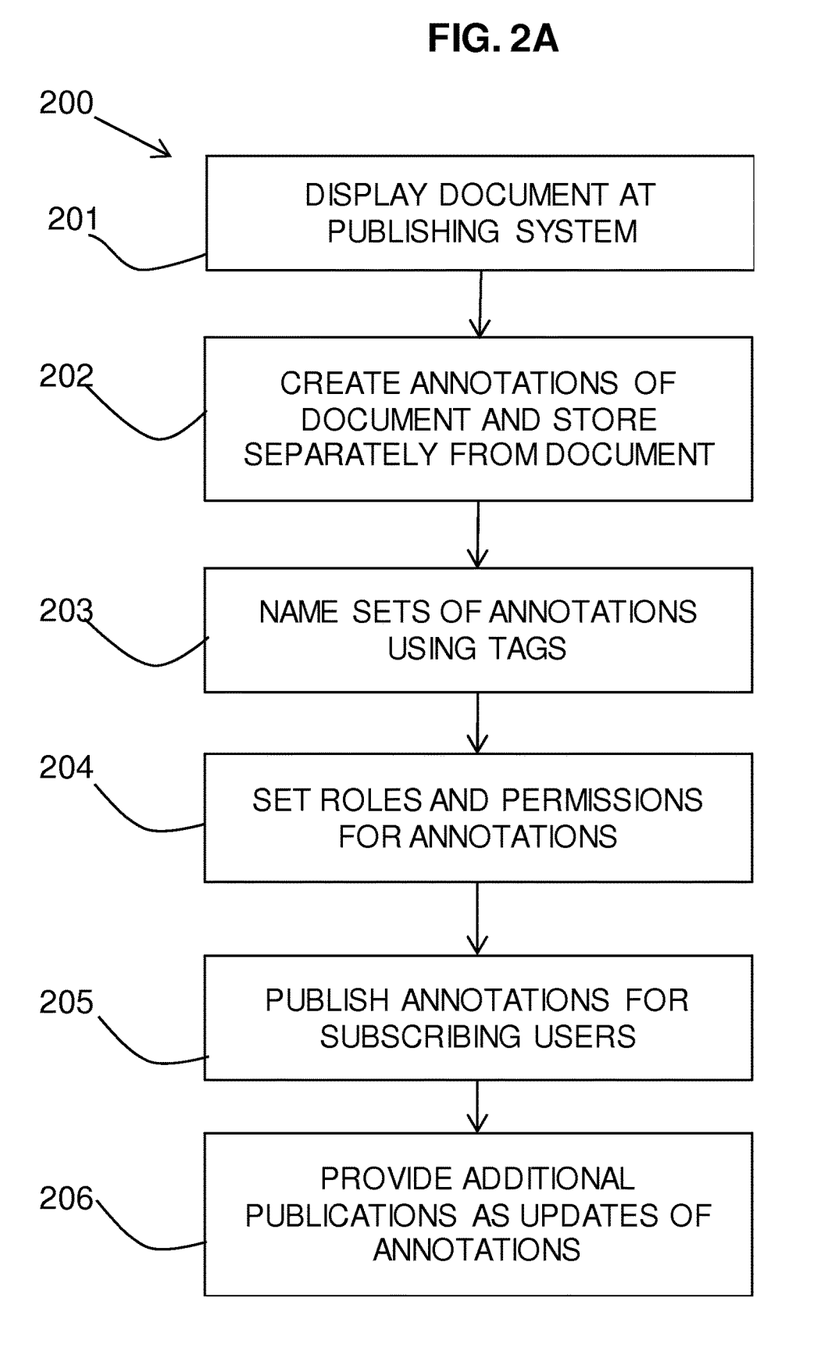
FIG. 2A is a flow diagram of an example embodiment of a method for preparing a document at a publishing system, in accordance with embodiments of the present invention.

Referring to FIG. 2A, a flow diagram 200 shows an example embodiment of an aspect of the described method as carried out at a publishing system 110.

A document may be displayed 201 at a publishing system. Annotations may be created 202 at the publishing system and stored separately from the document to which they relate.

Sets of annotations may be named 203 using tags. Roles and permissions may also be set 204 for subscribing users of the annotations. The roles may be based on a subscribing user's registration process. For example, a subscribing user may be a student in Grade 5. Different permissions may be provided for a role of "student" and for a role of "Grade 5" which may be defined by the publisher. The permissions may include, without limitation, restrictions on access to annotations, restrictions on editing of the annotations, time constraints for access to the annotations, and location restraints for access to the annotations.

The publishing system may publish 205 the annotations for subscribing users. Additional publications of updates to the annotations may also be provided 206.

Publishing System

An embodiment of a publishing system is described herein without limitation. The publishing system may include various settings and configurations allowing various levels of access to published annotations. The publishing user may have various levels of privileges allowing them to provide levels of restriction or access to the annotations.

The publishing user may choose to publish a single annotation, or to group a set of annotations in a named set. The publishing user may add tags to the published annotation or named set, which describes what the annotations are about.

The publishing user may add pages or other location information of the document to the published item to state to which page(s) of the document the annotations refer.

The publishing user may restrict the subscription to a specified user, a group of users or based on roles/permissions.

The publishing user may select whether each of the published items needs a subscription, or whether a user/group/role may automatically pick up the published items for the document.

The publishing user may edit annotations and re-publish. In an embodiment any subscriber that received the original annotations may automatically pick up the updates and changes.

The publishing user may choose and set restrictions on whether subscribers can edit the published items.

The publishing user may choose to schedule when the items will be available for subscription/pushed to other viewers of the document. They may also set the duration for which the published item remains valid.

In an embodiment there may be two types of durations. A first type of duration is where an annotation is available for subscription. For example, from Monday morning to Monday evening, the annotation is available for subscription. A second type of duration may be applied after the annotation has been subscribed to. It controls the duration for which it will be valid as an overlay on the document. For example, the annotation is only valid on Monday and Tuesday. After Tuesday, even though the user has subscribed, the annotation becomes invalid and is not displayed.

The publishing user may restrict the published item to subscribers from a particular location based on their request location. A location may be provided by coordinates, country tags (for example, .uk, .ca in URLs, etc.), etc. Similar to time, there may be two types of location information: one that restricts subscription (only users from a certain location can subscribe to an annotation), and one that restricts displaying of the annotation. When already subscribed, the annotation may only be permitted to be displayed if the user is in a certain location. For example, the user is in the UK. Once the user moves out of the UK, the annotation is hidden. On a more local example, a student may not be permitted to display a set of annotations in an examination room.

The publishing user may allow the system to indicate a version of a published item and add a comment to describe the change. The comment may be visible to subscribers.

The publishing user may choose to do one or more of the above.

Figure 2B:
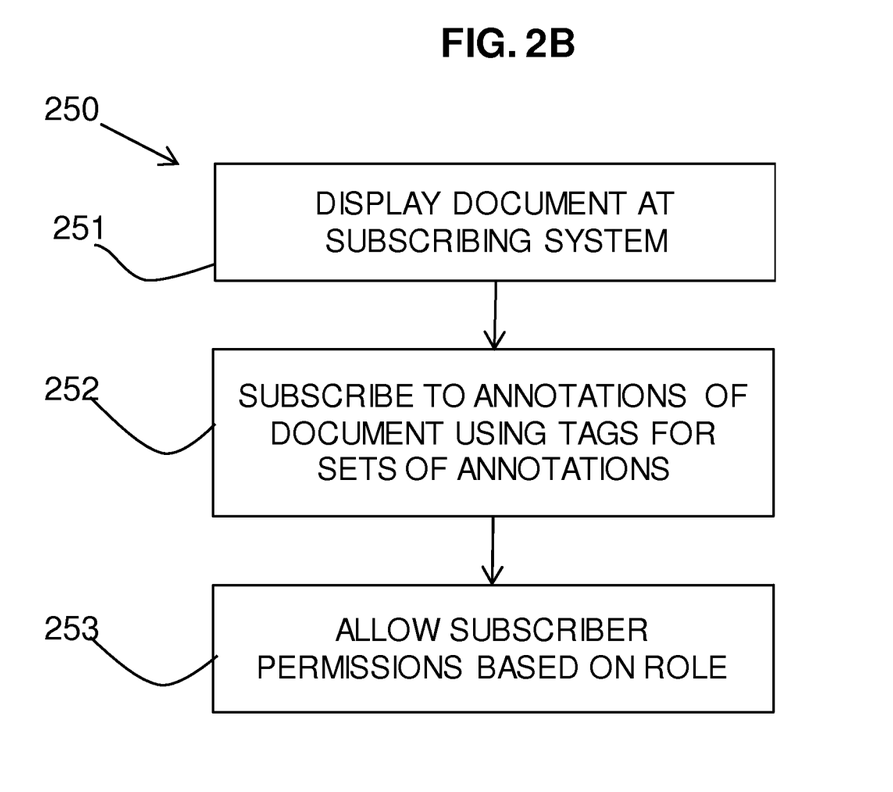
FIG. 2B is a flow diagram of an example embodiment of a method for using a document at a subscribing system, in accordance with embodiments of the present invention.

Referring to FIG. 2B, a flow diagram 250 shows an example embodiment of an aspect of the described method as carried out at a subscribing system 131, 132.

A document may be displayed 251 at a subscribing system. The subscribing system may subscribe 252 to annotations of the document using tags for naming sets of annotations. Subscription may be based on additional filters such as the publishing system and the published document.

A subscribing system may be allowed 253 permissions of how to handle the annotations based on a defined role of the subscribing system user. The permissions may relate to access and editing of the annotations. The permissions may relate to time and/or location of access to the annotations by the subscribing system user.

The subscription may include additional publications of updates to the annotations.

Subscribing System

An embodiment of a subscribing system and example subscription restrictions are described herein without limitation. For a document, the following subscription restrictions may be provided, in accordance with embodiments.

A subscribing user may only subscribe to annotations that they have privilege to access, as set by the publishing user. This may be based on a defined role of the subscribing user as defined during a login procedure to the system.

A subscribing user may choose to subscribe to show published annotations on a document by filtering on tags, on pages, on the publisher, or by the published date.

The annotations may be displayed on the document as pseudo annotations. The user may choose to save the subscribed annotations and link them with the document as though the user created them. The user can choose to burn one or more annotations into a local copy of the document (e.g., make one or more annotations permanent in the local copy). This means that the annotations become part of the document.

The subscribing user may choose not to save the annotations and may select "un-subscribe", which will remove the pseudo annotations.

The subscribing user may choose to remain subscribed to annotations but filter as to which annotations are displayed on the document by, for example, filtering based on any of the subscription filters defined above (e.g., tags), or the subscribing user may choose not to display any of the annotations.

In an embodiment the user can see the annotations in a list so that the annotations can be easily tracked. Selecting a particular annotation will show the information for that annotation and also allow the user to go to the portion of the document where that annotation is displayed. The user can browse the list and select one or more annotations to display on the document. The user can select an item from the list or from the document and request all versions of that item. The user can view the content of each version of the document and select to display a particular version on the document. The user can choose to always update the annotation displayed on the document with the latest version or keep to the one that was received when the user originally subscribed. Items with updates may be marked as having a later version.

The user can edit the pseudo annotations if the user has permission as set by the publisher. Edits may be published to other subscribers.

The user can subscribe without specifying a document such that the user will get a list of documents returned that has annotations matching the user's criteria.

As an alternative embodiment, instead of the subscribing system applying the role permissions of an annotation at a display component, this may be applied by the publish/subscribe broker.

The subscribing user may only receive the data of the annotation and not the roles, permission, time, etc. Instead this information may be held on the broker, and the subscriber system may periodically poll the broker to see if it needs to display/hide annotations.

Figure 3A:
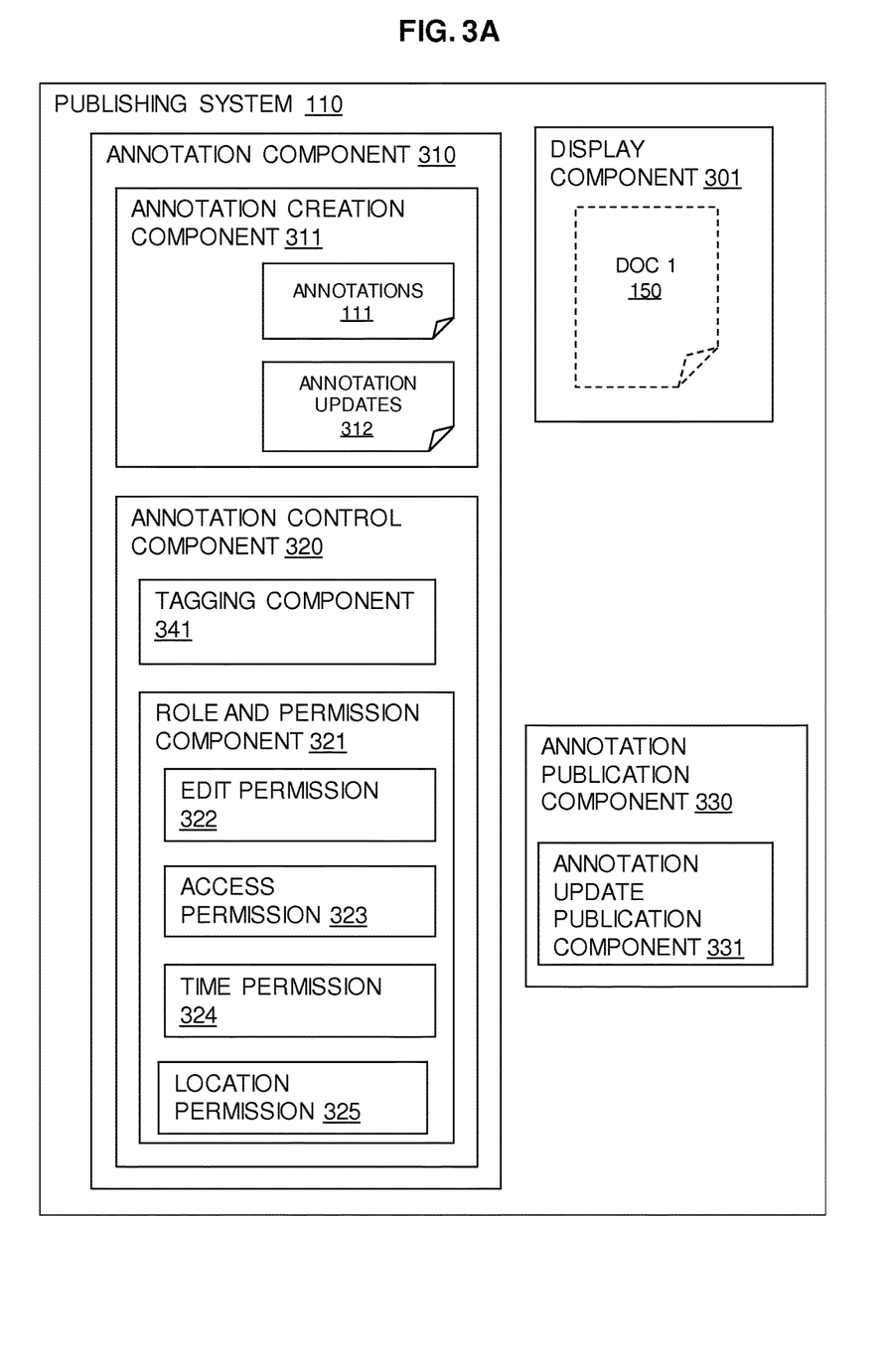
FIG. 3A is block diagram of an example embodiment of a publishing system, in accordance with embodiments of the present invention.

Referring to FIG. 3A, a block diagram shows an example embodiment of a publishing system 110. The publishing system 110 may be a client system of a publishing user having functionality for providing annotations in the form of an annotation component 310 which may be built on top of a document display component 301. The publishing system 110 may also include an annotation publication component 330 for publishing annotations of a document to a publish/subscribe broker for access by subscribing users.

An embodiment of the display component 301 may display a document 150. The document 150 may be viewed at the display component 301 from a remote server, for example, using a browser. The display component 301 may download a local copy of the document 150.

An embodiment of the annotation component 310 may include an annotation creation component 311 for creating annotations 111 to the document 150 and annotation updates 312. The annotations 111 are saved separately from the document 150 so that they can be received and applied to another copy of the document 150. The annotations 111 may include references to pages or locations in the document 150 to enable the annotations 111 to be correctly displayed in relation to the document 150.

The annotation component 310 may also include an annotation control component 320. The annotation control component 320 may enable a publishing user to control the delivery and use of the annotations by subscribing users.

An embodiment of the annotation control component 320 may include a tagging component 341 for tagging individual or a group of annotations for providing a naming of the annotations. The tags may be used by subscribing users to identify the annotations that they wish to subscribe to.

The annotation control component 320 may also include a role and permission component 321 which enables a publishing user to define subscribing users by roles and to allocate permissions to different roles. The permissions may include: an edit permission 322 enabling subscribing users having this permission to edit the annotations; an access permission 323 enabling subscribing users having this permission to access the annotations. The edit and/or access permissions 322, 323 may be further defined by time permission 324 and location permission 325 specifying a time and/or location at which the annotations may be accessed, viewed or edited.

Once annotations 111 and annotation updates 312 are created by the publishing user and controls in the form of tags, roles and permissions are added to the annotations 111 and annotation updates 312, the annotation publishing component 330 may publish the annotations 111 and an annotation update publication component 331 may publish the annotation updates 312.

Figure 3B:
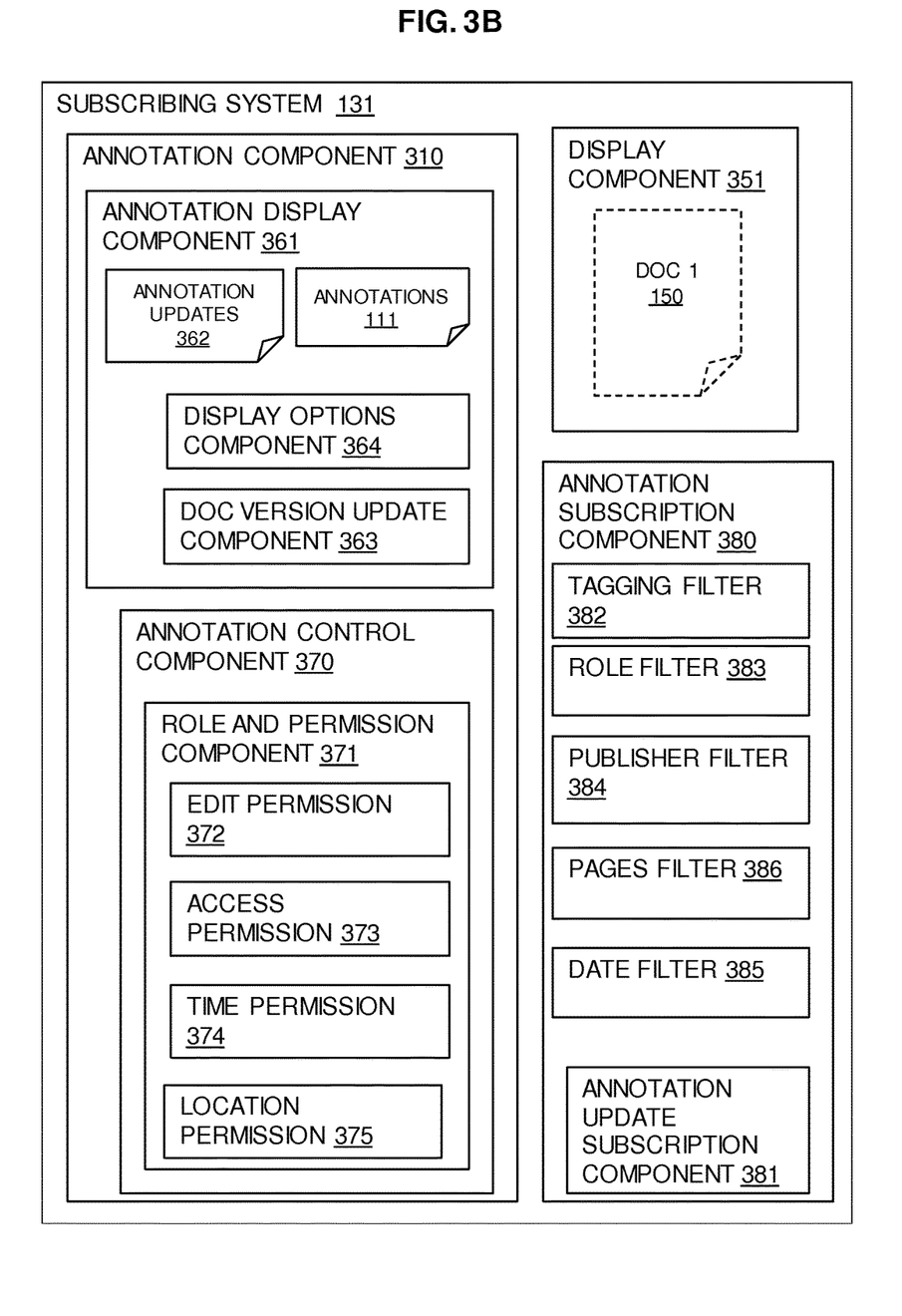
FIG. 3B is block diagram of an example embodiment of a subscribing system, in accordance with embodiments of the present invention.

Referring to FIG. 3B, a block diagram shows an example embodiment of a subscribing system 131. The subscribing system 131 may be a client system of a subscribing user and may have functionality for receiving annotations that may be displayed on top of a document 150.

The subscribing system 131 may include a display component 351. A document 150 may be viewed at the display component 351 from a remote server, for example, using a browser. The display component 351 may download a local copy of the document 150.

The subscribing system 131 may include an annotation component 310 having an annotation display component 361 which may be built on top of the display component 351 for displaying annotations 111 in relation to a document 150. The annotation display component 361 may display annotations 111 and annotation updates 362 for a document 150 received via an annotation subscription component 380. The annotation display component 361 may include a display options component 364 for determining which annotations are displayed, when they are displayed, for how long they are displayed, and how they are displayed in relation to the document 150. A document version update component 363 may also be provided by the annotation display component 361 to determine which version of a document 150 should be displayed.

An embodiment of the annotation subscription component 380 may enable a subscribing user to define which annotations and annotation updates to subscribe to. This may be defined by providing filters which may be applied at a publish/subscribe broker. The filters may be applied for subscriptions relating to a single document or across multiple documents.

A tagging filter 382 may be provided for filtering subscriptions by tags. A role filter 383 may be provided for filtering subscriptions by the role allocated to the subscribing user. A publisher filter 384 may be provided for filtering subscriptions from a single or a group of publishers. A pages filter 386 may be provided for filtering subscriptions relating to specific pages of a document. A date filter 385 may be provided for filtering subscriptions having a particular date/time range. A combination of filter criteria may be applied to refine the annotations a subscribing user wishes to receive.

An embodiment of an annotation update subscription component 381 may enable a subscribing user to request updates to any annotations received with the defined filter criteria.

An embodiment of an annotation control component 370 may also be provided with a role and permission component 371 which may define the role of the subscribing user, for example via a login procedure. Permissions relating to the use of annotations defined by the role of the subscribing user may be activated including an edit permission 372, an access permission 373, a time permission 374, and a location permission 375.

An embodiment of a client system may be both a publishing system and a subscribing system and may include functionality for both publishing and subscribing to annotations of documents. A publishing user may subscribe to annotations by other users, and a subscribing user may also publish annotations.

Example 1

A first example use of an embodiment is described herein. This first example may be a learning course that has a repository of course materials. A lecturer may highlight certain passages of text, add extra information, change certain content in a document and save the changes as a named set to publish. Each named set may be tailored to different groups of students in a class.

Each document may be a page and may have forward and back hyper-link annotations to other pages. The linked pages may be different for each subscriber, thus students viewing a document will follow a path with content suited to them while the underlying material remains unchanged.

The forwarding of the annotations may be scheduled such that students will only see them at a certain time and be able to move to the next part as scheduled by the lecturer.

The lecturer may make real-time updates to the published items or may add extra notes which the students will pick up.

Example 2

Another example use of an embodiment is described herein. This second example may be a company that has different annotations published for a page which will have different text/images according to where in the world the viewer is based such that content is displayed in the correct language and such that link annotations takes the viewer to sites that are specific to that locale.

The published items may be scheduled such that the content can be different depending on the day/week, etc.

Example 3

Yet another example use of an embodiment is described herein. This third example may be a group working on a project. A member of the group can subscribe and get a list of all documents that the team has worked on relating to a certain topic (via tags) and after a certain date.

A publish/subscribe system for providing annotations to a document including location and scheduling information provides advantages in control and delivery of annotations to a shared document. Annotations may be associated and displayed for a document without editing the document itself. Users may subscribe to annotations so they are notified of changes. This may be very useful in collaboration on a shared document library.

A database of annotations is associated with the shared, but immutable, documents, and a publish/subscribe system is linked to the database. The options described above are mostly a consequence of the domain of the database being a document annotation system.

Named sets of annotations are created that users can subscribe to. A named set can be aliased via the use of tags. Users can subscribe using the tags to subscribe to one or more sets of annotations. In addition, the described system adds the ability to allow users to subscribe to annotation on a particular page or set of pages.

A further development adds the ability to assign roles and permissions to the individual or named group. This can therefore restrict subscription not only based on the group name but also based on the role/permission. Thus instead of specifying particular groups that can subscribe, subscription may be limited based on role and permission.

The author or publisher may also have the ability to state which annotations can be edited/replied to and who can edit/reply to the annotation.

Access to annotations may also be based on time. The author may set a time limit on annotations, set a schedule for when it becomes available and when it expires. The time limit may relate to when the annotations are available for subscription and/or when they are available for display.

Access to annotations may also be based on the location of the subscriber. Thus moving in/out of the location may allow/disallow access/visibility to the annotation. The location may relate to a location at which subscriptions are available and/or locations at which annotations are available for display.

Figure 4:
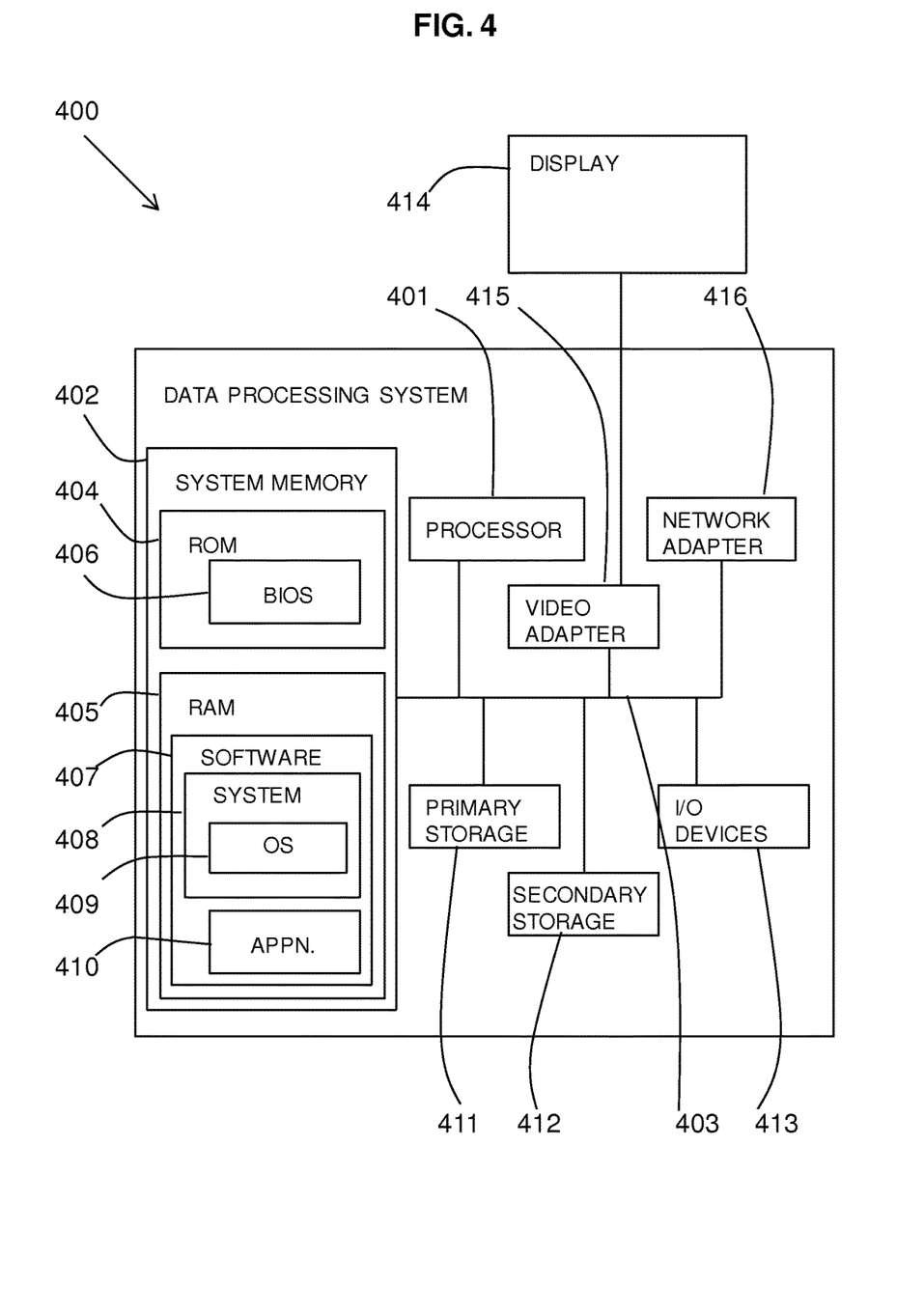
FIG. 4 is a block diagram of an embodiment of a computer system in which embodiments of the present invention may be implemented.

Referring to FIG. 4, an exemplary system for implementing aspects of embodiments of the invention includes a data processing system 400 suitable for storing and/or executing program code including at least one processor 401 coupled directly or indirectly to memory elements through a bus system 403. The memory elements may include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. Software 407 may be stored in RAM 405 including system software 408 and, more specifically, operating system software 409. Software applications 410 may also be stored in RAM 405.

The system 400 may also include a primary storage device 411 such as a magnetic hard disk drive and secondary storage device 412 such as a magnetic disc drive and an optical disc drive. The drives and their associated computer-readable media provide non-volatile storage of computer-executable instructions, data structures, program modules and other data for the system 400. Software applications may be stored on the primary and secondary storage devices 411, 412 as well as the system memory 402.

The computing system 400 may operate in a networked environment using logical connections to one or more remote computers via a network adapter 416.

Input/output devices 413 may be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

In an embodiment, the data processing system 400 may be a publish/subscribe system. Further, in an embodiment, the data processing system 400 may be a publishing system, a subscribing system, and/or a publish/subscribe broker system.

In an embodiment, the data processing system 400 may be a publishing system for managing documents annotations in a publish/subscribe system. The publishing system may include a memory. The publishing system may also include a processor communicatively coupled to the memory. The processor may include at least one processor circuit that is configured to perform, based instructions obtained from the memory, a method comprising: creating annotations of a document, the annotations including reference to locations for display of the annotations in relation to display of the document; storing the annotations separately from the document; naming a set of the annotations using at least one tag; setting roles and permissions for use of the set of the annotations by subscribing users including setting access permissions based on at least one constraint selected from a group consisting of a time constraint and a location constraint of a subscribing user; and publishing the set of the annotations to a publish/subscribe broker for access by the subscribing users.

In an embodiment, the data processing system 400 may be a subscribing system for managing documents annotations in a publish/subscribe system. The subscribing system may include a memory. The subscribing system may also include a processor communicatively coupled to the memory. The processor may include at least one processor circuit that is configured to perform, based instructions obtained from the memory, a method comprising: subscribing a user to annotations of a document, wherein each annotation is separate from the document and includes reference to display of the annotation in relation to display of the document; and defining a role of the subscribing user, wherein use permissions of a set of the annotations by the subscribing user are controlled based on the role, the use permissions including access permissions based on at least one constraint selected from a group consisting of a time constraint and a location constraint of the subscribing user.

As used herein, "a set of" refers to one or more.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer program product for managing document annotations in a publish/subscribe system as carried out at a publishing system, the computer program product comprising a computer readable storage medium having program instructions embodied therewith, the program instructions executable by a processor to cause the processor to:
    create annotations of a document, the annotations including reference to locations for display of the annotations in relation to display of the document;
    store the annotations separately from the document;
    name a set of the annotations using at least one tag;
    set roles and permissions for use of the set of the annotations by subscribing users including setting access permissions based on at least one constraint selected from a group consisting of a time constraint and a location constraint of a subscribing user; and
    publish the set of the annotations to a publish/subscribe broker for access by the subscribing users;

wherein the setting the access permissions based on the at least one constraint is applied based on a subscription time of the subscribing user, and wherein the access permissions are not applied based on a displaying time of the subscribing user.

2. A computer program product for managing document annotations in a publish/subscribe system as carried out at a publishing system, the computer program product comprising a computer readable storage medium having program instructions embodied therewith, the program instructions executable by a processor to cause the processor to:

create annotations of a document, the annotations including reference to locations for display of the annotations in relation to display of the document;

store the annotations separately from the document;

name a set of the annotations using at least one tag;

set roles and permissions for use of the set of the annotations by subscribing users including setting access permissions based on at least one constraint selected from a group consisting of a time constraint and a location constraint of a subscribing user; and publish the set of the annotations to a publish/subscribe broker for access by the subscribing users;

wherein the setting the access permissions based on the at least one constraint is applied based on a subscription location of the subscribing user, and wherein the access permissions are not applied based on a displaying location of the subscribing user.

* * * * *